United States Patent [19]

Mueller

[11] Patent Number: 5,450,456
[45] Date of Patent: Sep. 12, 1995

[54] METHOD AND ARRANGEMENT FOR MEASURING THE CARRIER FREQUENCY DEVIATION IN A MULTI-CHANNEL TRANSMISSION SYSTEM

[75] Inventor: Andreas Mueller, Nersingen, Germany

[73] Assignee: Daimler Benz AG, Stuttgart, Germany

[21] Appl. No.: 151,394

[22] Filed: Nov. 12, 1993

[51] Int. Cl.$^6$ .................... H04B 3/46; H04B 17/00; H04Q 1/20

[52] U.S. Cl. .................... 375/224; 375/343; 375/365; 370/20; 370/21; 370/105.1

[58] Field of Search ................ 375/10, 108, 106, 111, 375/114, 118; 370/13, 23, 19, 50, 20, 21, 70, 76, 105.1

[56] References Cited

U.S. PATENT DOCUMENTS

| | | | |
|---|---|---|---|
| 3,810,019 | 5/1974 | Miller | 375/38 |
| 4,152,649 | 5/1979 | Choquet | 375/13 |
| 4,811,357 | 3/1989 | Betts et al. | 375/1 |
| 5,029,184 | 7/1991 | Andren et al. | 375/10 |
| 5,191,576 | 3/1993 | Pommier et al. | 370/50 |
| 5,228,025 | 7/1993 | Le Floch et al. | 370/50 |

FOREIGN PATENT DOCUMENTS

| | | |
|---|---|---|
| 0369917 | 5/1990 | European Pat. Off. |
| 0373405 | 6/1990 | European Pat. Off. |
| 0441730 | 8/1991 | European Pat. Off. |
| 2337465 | 7/1977 | France |
| 2107895 | 9/1971 | Germany |
| 2920370 | 11/1980 | Germany |
| 3201375 | 7/1983 | Germany |
| 3227151 | 2/1984 | Germany |
| 3333714 | 4/1985 | Germany |
| 3819380 | 12/1989 | Germany |
| 3904900 | 8/1990 | Germany |
| 3903944 | 10/1990 | Germany |
| 4021641 | 2/1991 | Germany |
| 3935911 | 5/1991 | Germany |
| 4104096 | 8/1991 | Germany |
| 88/00417 | 11/1988 | WIPO |

OTHER PUBLICATIONS

Pfaffinger, Claus P.: DAB-Digitaler terrestrischer Hörrundfunk. Erste Versuchsaussendungen in München. In: Rundfunktechnische Mitteilungen, 1990, H. 3, S.131.

Dosch, Christoph: Erste Erfahrungen über den Empfang digitaler Tonsignale für Mobilempfang; in: Rundfunktechnische Mitteilungen, 1989, H. 1, pp. 8–12.

Wolf, Peter: Die 41. Jahrestagung der Technischen Kommission der UER. In: Rundfunktechische Mitteilungen, 1989, H.3, pp. 127–131.

N.N.: Digital Audio Broadcast—Nachfolge für den UKW-Hörfunk. In: Funkschau, H. 8, 1990, pp. 9–12 der Beilage "Funkschau Spezial".

IBM Journal of Research and Development; vol. 27, No. 5, Sep. 83, New York US, pp. 426–431. A Milewski: "Periodic Sequences with Optimal Properties for Channel Estimation and Fast Start–Up Equalization."

Coding Theory and Applications. 2nd international Colloquium Proceedings; pp. 159–172. R. Alexis: "Search for Sequences with Zero Autocorrelation."

IEEE Transactions on Aerospace and Electronic Systems vol. 27, No. 1, Jan. 91, pp. 92–101. F. E. Kretschmer et al. "Low Sidelobe Radar Waveforms Derived From Orthogonal Matrices."

1990 IEEE Military Communications Conference Milcom '90 vol. 1, pp. 273–277. P. H. Moose: "Differential Modulation and Demodulation of Multi–Frequency Digital Communications Signal."

IEEE Communications Magazine, vol. 28, No. 5, May 90; J. A. C. Bingham: "Multicarrier Modulation for Data Transmission: An Idea Whose Time Has Come."

*Primary Examiner*—Stephen Chin
*Assistant Examiner*—Don N. Vo
*Attorney, Agent, or Firm*—Spencer, Frank & Schneider

[57] ABSTRACT

A multi-channel transmission system operates by transmitting digitally-coded signals modulated in sequential symbol blocks at a plurality of carrier frequencies, and receiving and demodulating the digitally-coded signals, wherein, in the transmitting, a test signal is generated in at least one symbol block, the test signal containing at least one periodically continued, differentially coded, self-orthogonal sequence of a constant amplitude modulated to a part of the plurality of carrier frequencies within a symbol block in differential coding.

22 Claims, 15 Drawing Sheets

METHOD AND ARRANGEMENT FOR MEASURING THE CARRIER FREQUENCY DEVIATION IN A MULTI-CHANNEL TRANSMISSION SYSTEM

BACKGROUND OF THE INVENTION

1. Field of the Invention

The invention relates to a method and an arrangement a transmission method and a multi-channel transmission system.

The invention is used in a COFDM (Coded Orthogonal Frequency Division Multiplexing) transmission system that has been proposed for digital radio.

2. Background Information

COFDM is a digital multi-channel modulation method. In such a method, the data signal to be transmitted is divided to a number of N (e.g. several 100) subchannels which lie next to one another in the frequency domain, with their spectra possibly also overlapping. With this division, the data rate transmitted in each subchannel is only a fraction of the original. The symbol duration is extended in the same ratio which has an advantageous effect if echoes appear on the transmission path. By selecting N to be sufficiently high, it is always possible for the symbol duration to be long relative to the maximum echo delay. Thus the symbol interference caused by echoes is reduced to the extent that the signal can be demodulated without distortion.

The COFDM transmission signal $s(t)$ can be represented in the base band as a superposition of time and frequency shifted basic pulses $b(t)$:

$$s(t) = \sum_i \sum_k s_{i,k} b(t - iT_s) e^{j2\pi k F S(t - iTS)} \quad (1)$$

The basic pulse is here given by $$b(t) = \begin{cases} 1 & \text{for } -t_g < t < t_s \\ 0 & \text{otherwise} \end{cases} \quad (2)$$

$j = \sqrt{-1}$ is the imaginary unit.

The summation index i represents the symbol clock, index k represents the subchannel. The following parameters describe the COFDM modulation method:

$T_s$: symbol duration
$t_s$: utilized symbol duration
$t_g$: protection period
$F_s$: subchannel spacing They are related by way of the equations $T_s = t_s + t_g$ and $F_s = 1/t_s$. The quotient of the utilized symbol duration and the symbol duration, $\gamma = t_s/T_s$ can be defined as a further parameter. In the COFDM variations presently being discussed for use in digital radio, it always applies that $\gamma = 0.8$. Under consideration of these relationships, the COFDM system has only one free parameter from which the remaining can be derived.

The information to be transmitted is coded in complex symbols $d_{i,k}$. In COFDM, 4-phase keying is employed as the modulation method; it therefore applies that $d_{i,k} \epsilon (1, j, -1, -j)$. In order for the transmission to be insensitive to channel specific phase shifts, it is not the $d_{i,k}$ symbols that are transmitted but the transmission signals $s_{i,k}$ produced by differential coding $s_{i,k} = s_{i-1,k} \cdot d_{i,k}$. Sometimes it is practical to combine the transmission symbols of all subchannels that were transmitted during the same time slot i into an N-dimensional vector $s_i$. Such a vector is called a symbol block.

The generation of the COFDM transmission signal is effected, for example, digitally with the aid of the inverse fast Fourier transformation (IFFT). The block circuit diagram of a COFDM transmitter is shown in FIG. 14a. An IFFT is calculated for each time slot i. The output signal of the IFFT has the duration $t_s$. It is continued periodically to become a signal of the duration $T_s$.

The COFDM demodulator serves to recover the information carrying symbols $d_{i,k}$. For this purpose, the following values are formed from the receiver input signal $r(t)$:

$$r_{i,k} = \frac{1}{t_s} \int_0^{t_s} r(t + iT_s) \cdot e^{-j2\pi k F_s t} dt \quad (3)$$

From this value, estimated values $d_{i,k}$ are derived for the data symbols by differential demodulation $d_{i,k} = r_{i,k} r^*_{i-1,k}$, where $r^*$ is the conjugate complex to r.

The COFDM demodulator is also realizable digitally with the aid of the fast Fourier transformation (FFT). It is shown in FIG. 14b. A section of the duration $t_s$ of the received signal is evaluated for every time slot. One section of the duration $t_g$ remains unevaluated. The echoes of the signal from the preceding time slot fall into this section.

Data transmission in the COFDM system is frame oriented. A frame is a structured arrangement of timely successive symbol blocks. It has the following structure shown in FIG. 15:

The first symbol block $s_1$ in the frame is the zero symbol. It is characterized by the fact that no transmission signal is propagated. By means of an envelope detector, the receiver is able to detect the break in the field intensity. The distance between the zero symbols of the $n^{th}$ and the $(n+1)^{th}$ frame serves to synchronize the frames, the duration of the zero symbol serves to synchronize the symbols. The zero symbol is not processed by means of the FFT. It generally has a length other than $T_s$.

The second symbol block $s_2$ in the frame is the phase reference symbol. It is required to initialize the differential demodulator. It is a complex sweep signal $s_{2,k} = \exp(j \pi k^2/N)$.

The remainder of the frame is composed of information carrying symbol blocks.

COFDM requires that the carrier frequencies of transmitter and receiver match very precisely. The maximum tolerated deviation lies in an order of magnitude of 5% of the subchannel spacing $F_s$. This can be realized only with very expensive special oscillators which are not suitable for mass production. It is better to employ a controlled oscillator in the receiver. At the moment of turn-on, however, this oscillator may have a frequency deviation in the order of magnitude of several subchannel spacings.

SUMMARY OF THE INVENTION

It is the object of the invention to measure the frequency deviation between transmitter and receiver by observing the received signal to then suitably correct the oscillator frequency in order to be able to use a control process.

This is accomplished by a system and method which includes transmitting digitally-coded signals modulated in sequential symbol blocks at a plurality of carrier frequencies, and receiving and demodulating the digitally-coded signals, wherein, in the transmitting, a test signal is generated in at least one symbol block, the test signal containing at least one periodically continued, differentially coded, self-orthogonal sequence of a constant amplitude modulated to a part of the plurality of carrier frequencies within a symbol block in differential coding. Advantageous features and/or modifications are defined below.

BRIEF DESCRIPTION OF THE DRAWINGS

The above and other features of the invention will become apparent from the following detailed description taken with the drawings in which.

DETAILED DESCRIPTION OF THE PREFERRED EMBODIMENTS

Figure 1:
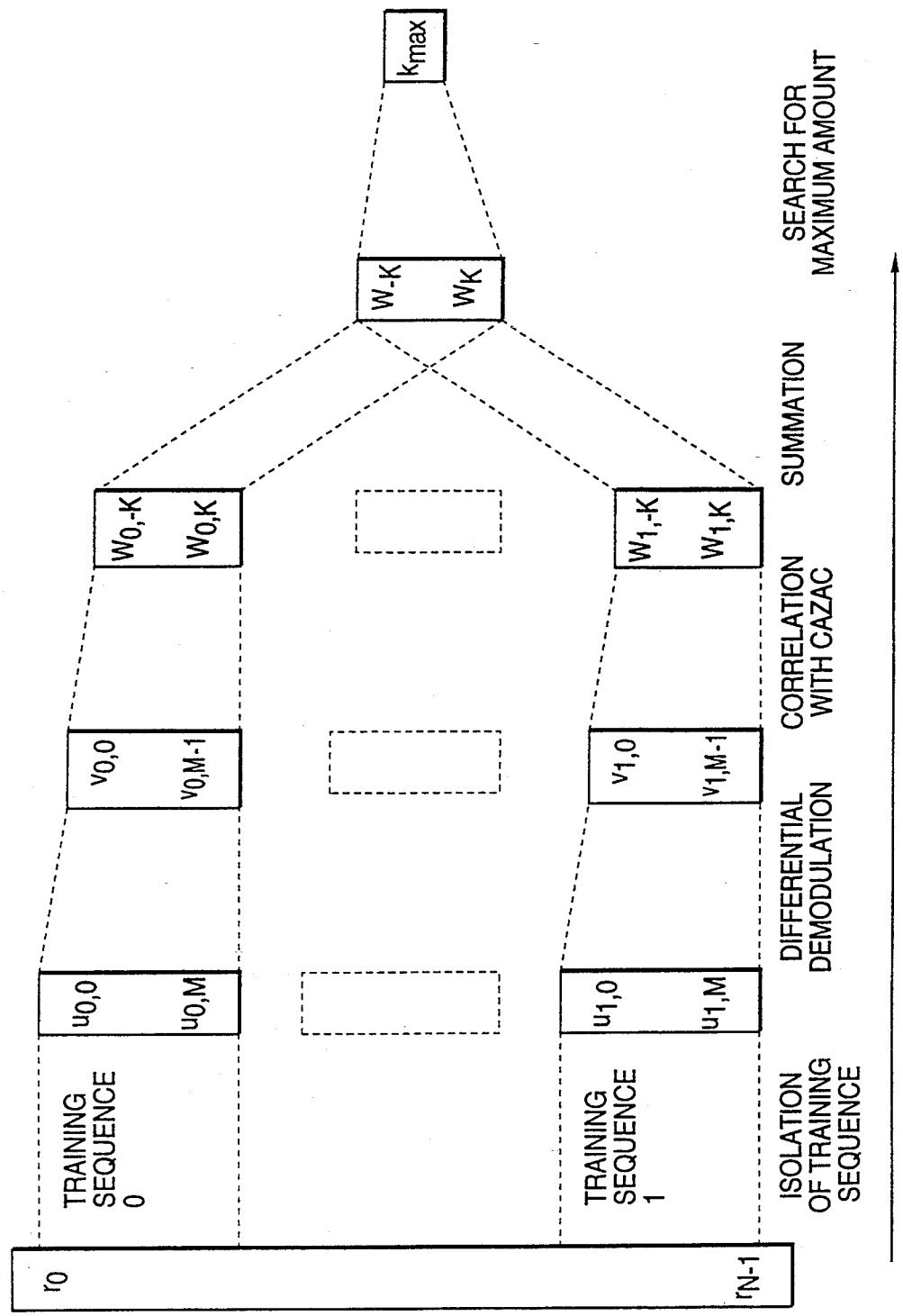
FIG. 1 shows a processing sequence schematically.

The solution according to the invention resides in the periodically repeated transmission of a test signal with the aid of which the receiver is able to determine an existing frequency deviation. For practical reasons, it is advisable to transmit this test signal in each frame. The basic concept of the invention is to replace the previously existing sweep signal by this new test signal.

One advantage of the invention is that, with a single test signal, it is possible to measure the frequency deviation as well as, by determining the channel pulse response, the fine synchronization.

Another advantage is that the COFDM system requires no additional capacitance for this test signal since it replaces the previous phase reference signal.

The frequency deviation can advantageously be determined precisely and robustly. Thanks to the differential coding of the CAZAC sequence, the accuracy of the measured frequency deviation is not influenced by inaccuracies in the synchronization.

Since the test signal serves to simultaneously control time, frequency and phase, it is called the time/frequency/phase control symbol block (TFPC).

The TFPC is based on self-orthogonal sequences of a constant amplitude, so-called CAZAC (constant amplitude zero autocorrelation) sequences. These are finite sequences whose cyclic autocorrelation for mutually shifted sequences is zero. At least one CAZAC sequence is required to construct the TFPC. There may also be several, and one sequence may be employed several times. Therefore, a multitude of different combinations are suitable as TFPC. For that reason, the TFPC is initially defined generally and then clarified with the aid of an embodiment.

In one embodiment, the TFPC is the COFDM symbol block $s_{2,k}$. It is characterized in that at least one contiguous section $s_{2,k_0}, s_{2,k_0+1}, \ldots, s_{2,k_0+L-1}$ of the length L exists which, except for a complex multiplier A, corresponds to a finite sequence $x_i$ (i=0, 1, ..., L−1):

$$s_{2,k_0+i} = A x_i \, (i=0, 1, \ldots, L-1).$$

Such a section is called a training sequence.

This allows for the generation of $x_i$ as follows:

A four-value CAZAC sequence $c_m$, (m=0, 1, ..., M−1) of a length M<L is continued periodically to reach the length L−1.

Then $x_i$ is defined as follows:

$$x_i = \begin{bmatrix} 1 & \text{for } i = 0 \\ x_{i-1} C_{(i-1) \bmod M} & \text{for } 1 \leq i \leq L-1 \end{bmatrix} \quad (4)$$

$\chi_i$ is thus a differentially coded, periodically continued four-value CAZAC sequence.

The following limitations apply for the values M and L:

M must be the valid length of a four-value CAZAC sequence. At present, four-value CAZAC sequences are known to have the lengths 4, 8 and 16. It is also known that there are no four-value CAZAC sequences of other lengths less than 16.

In order for the correlation measurement to be described below to have precisely one distinct maximum, the relationship of L<2M must be adhered to.

For the measuring range of the arrangement to be described below, that is, the maximum frequency deviation $\Delta F$ between transmitter and receiver that can be measured, the following applies:

$$-\frac{L-M-1}{2} F_s \leq \Delta F \leq \frac{L-M-1}{2} F_s$$

The divisions must here be understood as integer divisions.

It is favorable for L−M to be an odd number since the system then has the same measuring range as if a training sequence of the length L+1 were used. This is assumed to be the case in the discussions below. If L−M is even, a few algorithms must be modified, which is easily done.

The TFPC may contain a plurality of the above-described training sequences which may also overlap.

The different training sequences may here be based on the same or also on different CAZAC sequences.

If symbols $s_{2,k}$ of the TFPC exist which do not belong to at least one training sequence of the above-discussed type, these symbols may take on any desired values other than zero.

Particularly favorable conditions exist if all symbols $s_{2,k}$ of the TFPC have the same amplitude.

In one embodiment, the TFPC is composed of a number of training sequences that is divisible by four. The TFPC is constructed of four CAZAC sequences produced from one CAZAC sequence by multiplication with 1, j, −1, -j. This arrangement results in particularly good accuracy and simultaneously particularly low computation efforts for the evaluation. The modulator employs a 128-point IFFT so that a total of 128 subchannels are available. They are numbered consecutively from 0 to 127. For filter technology reasons, only 86 of these 128 carriers are modulated, the so-called active subchannels. These are the carriers numbered 20 to 63 and 65 to 107. For technical reasons, the carrier numbered in this example cannot be utilized.

The basic CAZAC sequence is here given as follows:

| i   | 0  | 1  | 2 | 3 | 4  | 5  | 6 | 7  | 8 | 9 | 10 | 11 | 12 | 13 | 14 | 15 |
|-----|----|----|---|---|----|----|---|----|---|---|----|----|----|----|----|----|
| $C_{0,i}$ | −j | −1 | 1 | 1 | −1 | −j | 1 | −1 | j | 1 | 1  | 1  | 1  | j  | 1  | −1 |

By multiplication with j, −1, −j, the following three CAZAC sequences are produced:

| i   | 0  | 1  | 2  | 3  | 4  | 5  | 6  | 7  | 8  | 9  | 10 | 11 | 12 | 13 | 14 | 15 |
|-----|----|----|----|----|----|----|----|----|----|----|----|----|----|----|----|----|
| $C_{1,i}$ | 1  | −j | j  | j  | −j | 1  | j  | −j | −1 | j  | j  | j  | j  | −1 | j  | −j |
| $C_{2,i}$ | j  | 1  | −1 | −1 | 1  | j  | −1 | 1  | −j | −1 | −1 | −1 | −1 | −j | −1 | 1  |
| $C_{3,i}$ | −1 | j  | −j | −j | j  | −1 | −j | j  | 1  | −j | −j | −j | −j | 1  | −j | j  |

The length of the CAZAC sequences in this example is M=16. L is selected to be 23; then a frequency deviation of ±3 subchannel spacings can be measured. The CAZAC sequences $c_{l,i}$ are extended by 3 elements each at the front and at the back and are differentially coded to yield the training sequences $x_{l,i}$.

| i   | 0 | 1  | 2  | 3  | 4  | 5  | 6  | 7  | 8  | 9  | 10 | 11 |
|-----|---|----|----|----|----|----|----|----|----|----|----|----|
| $x_{0,i}$ | 1 | j  | j  | −j | −1 | 1  | 1  | 1  | −1 | j  | j  | −j |
| $x_{1,i}$ | 1 | −1 | −j | −1 | −1 | j  | −1 | −j | −1 | −1 | −j | −1 |
| $x_{2,i}$ | 1 | −j | j  | j  | −1 | −1 | 1  | −1 | −1 | −j | j  | j  |
| $x_{3,i}$ | 1 | 1  | −j | 1  | −1 | −j | −1 | j  | −1 | 1  | −j | 1  |

| i   | 12 | 13 | 14 | 15 | 16 | 17 | 18 | 19 | 20 | 21 | 22 |
|-----|----|----|----|----|----|----|----|----|----|----|----|
| $x_{0,i}$ | 1  | 1  | 1  | 1  | 1  | j  | j  | −j | −1 | 1  | 1  |
| $x_{1,i}$ | 1  | j  | −1 | −j | 1  | −1 | −j | −1 | −1 | j  | −1 |
| $x_{2,i}$ | 1  | −1 | 1  | −1 | 1  | −j | j  | j  | −1 | −1 | 1  |
| $x_{3,i}$ | 1  | −j | −1 | j  | 1  | 1  | −j | 1  | −1 | −j | −1 |

The following values are counted for the complex scaling factors $A_l$:

| l   | 0 | 1 | 2  | 3  |
|-----|---|---|----|----|
| $A_l$ | 1 | 1 | −j | −1 |

Index offsets $k_l$ are defined:

| l   | 0 | 1 | 2 | 3 |
|-----|---|---|---|---|
| $k_l$ | 21 | 40 | 65 | 84 |

The TFPC is composed of four training sequences. The TFPC vector of dimension 128 is here defined as follows:

$$s_{2,k} = \begin{cases} A_0 x_{0,k-k_0} & \text{for } 21 \leq k < 44 \\ A_2 x_{2,k-k_2} & \text{for } 40 \leq k < 63 \\ A_1 x_{1,k-k_1} & \text{for } 65 \leq k < 88 \\ A_3 x_{3,k-k_3} & \text{for } 84 \leq k < 107 \\ 1 & \text{for } k = 63, k = 107 \\ 0 & \text{otherwise} \end{cases}$$

It must be noted, firstly, that in this example the training sequences overlap (in regions k=40 ... 43 and k=84 ... 87); secondly that subchannels K=63 and k=107 are not part of a training sequence and therefore were set arbitrarily; thirdly, that this TFPC has a constant amplitude in all active subchannels; and fourthly that it is composed of four CAZAC sequences which were produced by multiplication with 1, j, −1, −j from one CAZAC sequence.

For the evaluation of the TFPC it is assumed that the receiver is already roughly symbol synchronized on the basis of the evaluation of the zero symbol. The permissible synchronization error lies in an order of magnitude of ±0.5 $t_g$. The receiver is then able to localize the TFPC signal in time and to subject it to an FFT. The vector $r_2$ according to Equation 3 is then present at the output of the FFT. This vector is now subjected to special processing which will be described below.

The receiver has stored the transmitted TFPC symbol. The training sequences contained in the TFPC, their position within the TFPC and the CAZAC sequences on which they are based are also known.

The processing of the TFPC is subdivided into several sub-tasks which in turn are composed of different processing steps. The sub-tasks are the following:

Rough measurement of the frequency deviation between transmitter and receiver.

Fine measurement of the frequency deviation between transmitter and receiver.

Measurement of the pulse response of the radio channel.

Buildup of the phase reference for the differential demodulation.

Common input value for all sub-tasks is $\gamma_2$.

The rough measurement of the frequency deviation between transmitter and receiver is accurate to the order of magnitude of a subchannel distance. The following processing steps are required for this purpose:

1. Isolation of the received training sequences $Y_{2,k0+1}$. The position of the training sequences in the transmitted TFPC is assumed to be known. A training sequence begins in the transmitted TFPC at $s_{2,k0}$. Then the (M+1)-dimensional vector u is calculated as follows:

$$u_k = \tau_{k+k0+\frac{L-M-1}{2}} \quad 0 \leq k \leq M \tag{5}$$

If the TFPC contains several training sequences, the procedure is the same for each one of them and a plurality of vectors $u_i$ are obtained.

2. Differential demodulation. The M-dimensional vector v is calculated with the aid of the following equation:

$$v_k = u_{k+1} u_k^* \quad 0 \leq k < M \tag{6}$$

If the TFPC contains several training sequences, the procedure is the same for each one of them and a plurality of vectors $v_i$ are obtained.

3. Cyclic correlation with the CAZAC sequence. Vector $v$ is correlated with the CAZAC sequence on which the training sequence is based. The (L−M)-dimensional vector w is calculated with the following equation:

$$w_k = \sum_{m=0}^{M-1} v_m c^*_{(m-k)\bmod M} \quad -K \leq k \leq K = \frac{L-M-1}{2} \tag{7}$$

If there are several training sequences in the TFPC, this calculation is made for each $v_i$ and one obtains the associated $w_i$. These are then added to form a vector: $w = \Sigma_i w_i$.

4. The $w_k$ of the greatest amount is determined. The associated index $k_{max}$ provides the searched-for frequency deviation: $\Delta F = k_{max} F_s$.

The correlation with the CAZAC sequence is simplified in that $c_m$ takes on only the values 1, j, −1 and −j.

Figure 2:
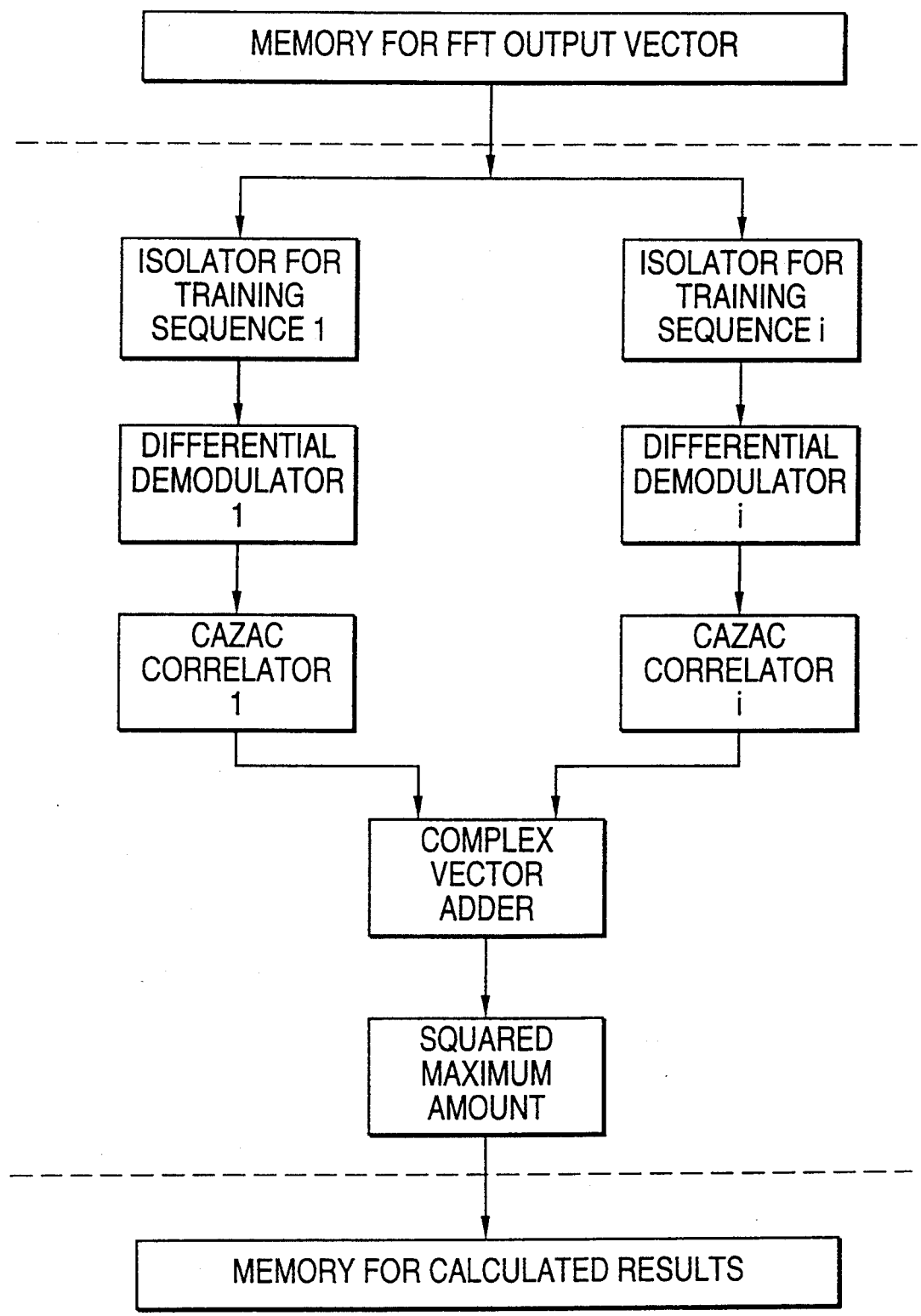
FIG. 2 shows the arrangement of an individual component group.

The above-described processing sequence is shown schematically in FIG. 1. The arrangement of the individual component groups is shown in FIG. 2. The vector r generated at the start of FFT processing for the symbol block containing the test signal is placed in a memory for intermediate storage for the purpose of further processing. This vector possesses the components $r_0$ through $r_{N-1}$. Test sequences are contained in symbol block i. These different test sequences are isolated separately from vector r as vectors U by isolators for different test sequences. For each test sequence, a vector V is formed in a differential demodulator; in a CAZAC correlator, this vector is cyclically correlated with the CAZAC sequence that forms the basis of the respective test sequence. During the correlation, the vectors w are generated for the different test sequences; these vectors are subsequently summed in a complex vector adder. The squared amount of the elements is formed in the sum vector, and the element having the maximum amount is determined. The index $k_{max}$ associated with this element serves in the rough determination of the frequency deviation. The ascertained results can be stored in a further memory.

Figure 10:
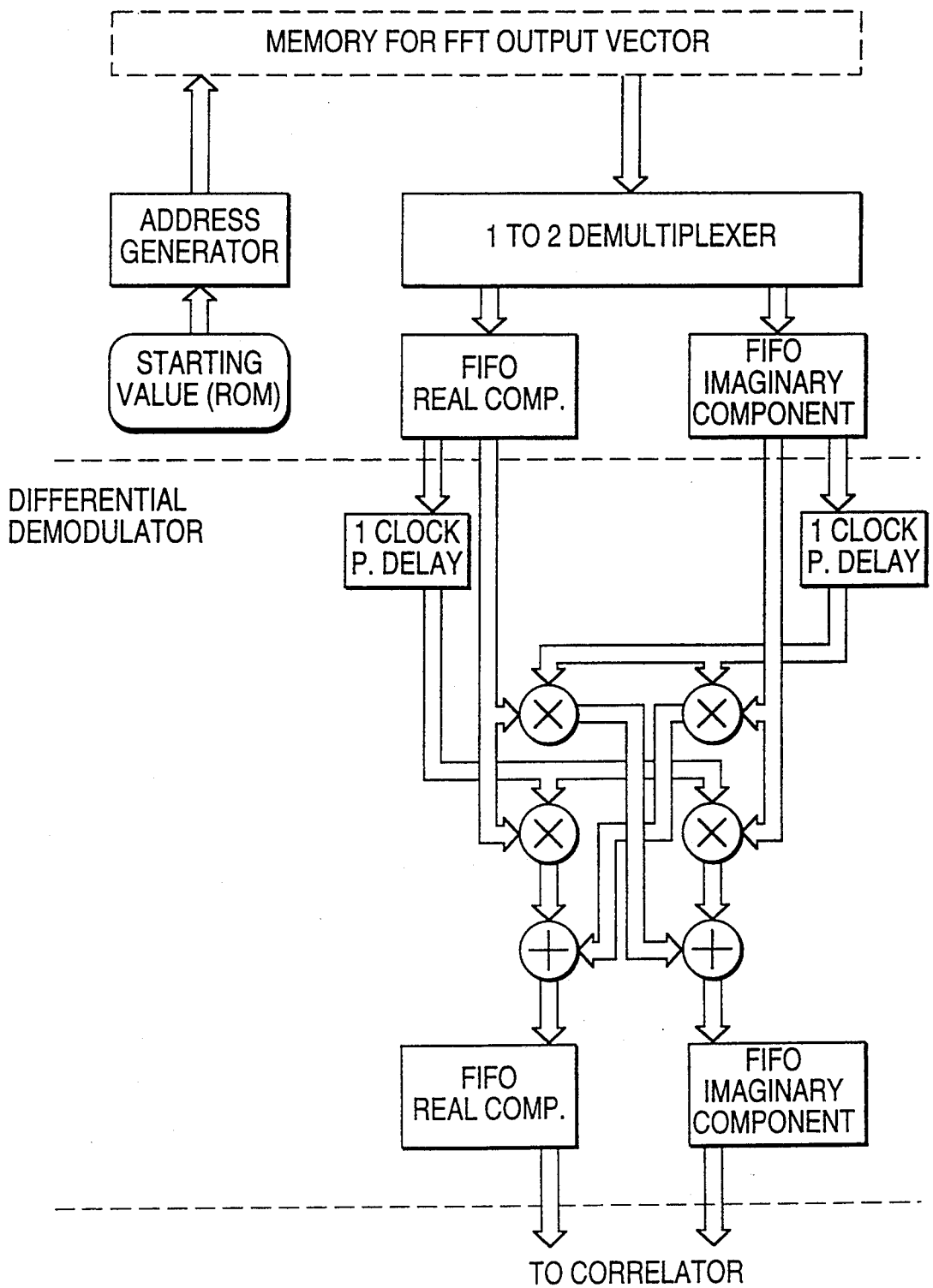
FIG. 10 shows an exemplary configuration of an isolator.

In the configuration for isolation and differential demodulation of training sequences shown in FIG. 10, the starting values of the individual training sequences within the majority of carrier frequencies are stored in a read-only memory (ROM). These values are converted into control addresses in an address generator in order to actuate the memory for the output vectors of the FFT. The different training sequences can be isolated in a simple manner through the entry of the starting addresses for the training sequences. The stored values associated with a training sequence are read out in a predetermined reading cycle as of the starting address, and a series of real components and a series of imaginary components are formed from the complex value sequence in a 1-to-2 demultiplexer and each entered into one of two shift registers (FIFO).

By means of a delay element for each register cycle, two complex values that are successive in the training sequence are always available simultaneously in the signal paths of real components and imaginary components.

A further complex value series which is fed to the correlator via further shift registers results from complex multiplication of two such complex values according to Equation (6).

Figure 12:
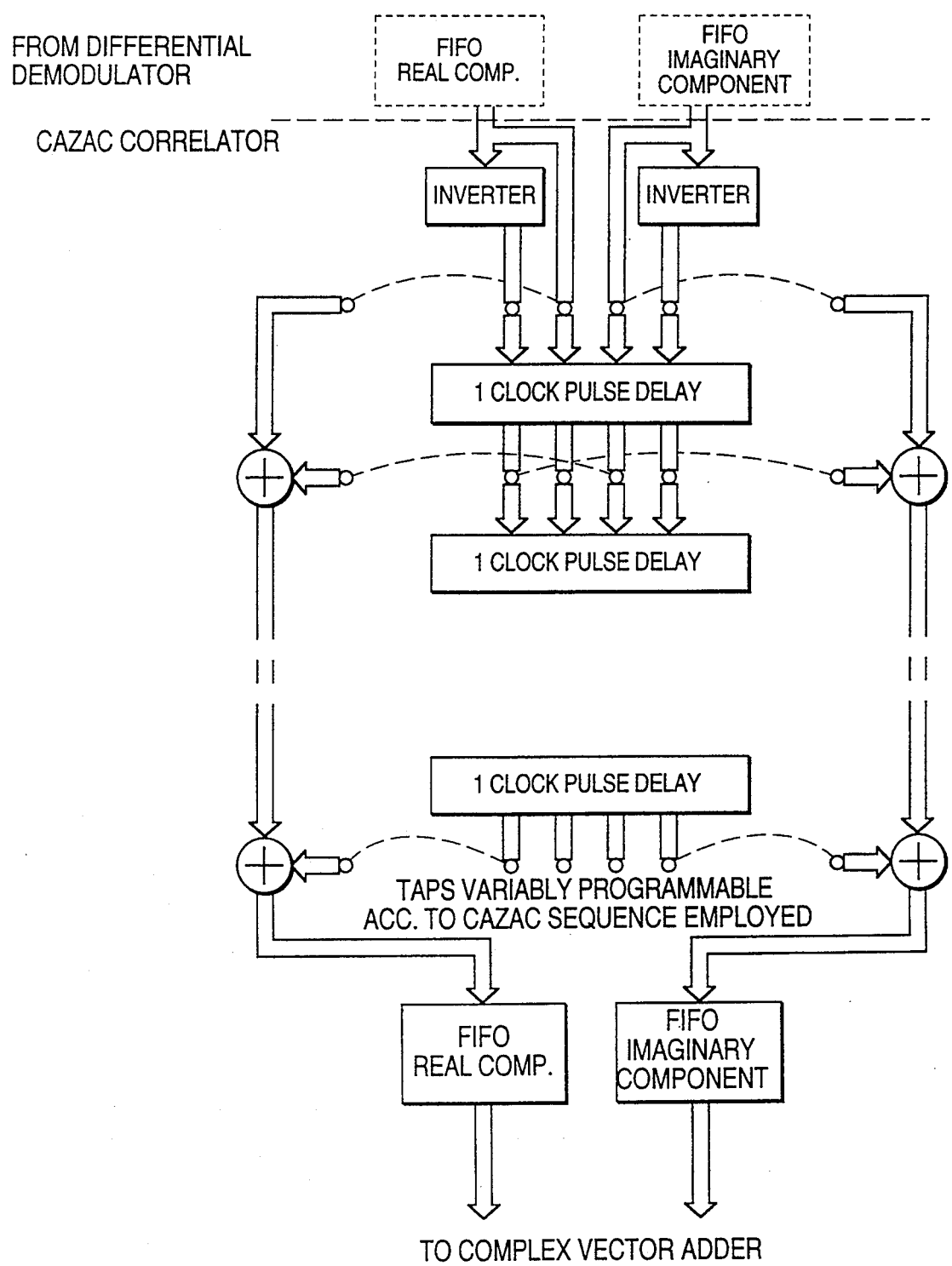
FIGS. 12 and 13 show the configuration of an exemplary correlator and complex vector adder, respectively.

FIG. 12 shows a correlator for four-value CAZAC sequences. The correlator is represented in a standard manner as a shift register having a plurality of register stages which are delayed with respect to one another by one register cycle. In this correlator, the outputs of the individual register stages are weighted with values of the CAZAC sequence forming the basis of the training sequence and summed. In a four-value CAZAC sequence, only the weightings 1, j, −1, −j are provided, so the correlation is significantly simplified by the insertion of two inverters. In addition to real component Re and imaginary component Im, for each register cycle, the inverted components −Re and −Im are also present for a complex value. In place of the multiplication in weighting, one of these four values can simply be selected, as indicated by the solid lines in the drawing. The correlator outputs are fed to the complex vector adder via further shift registers.

Figure 3:
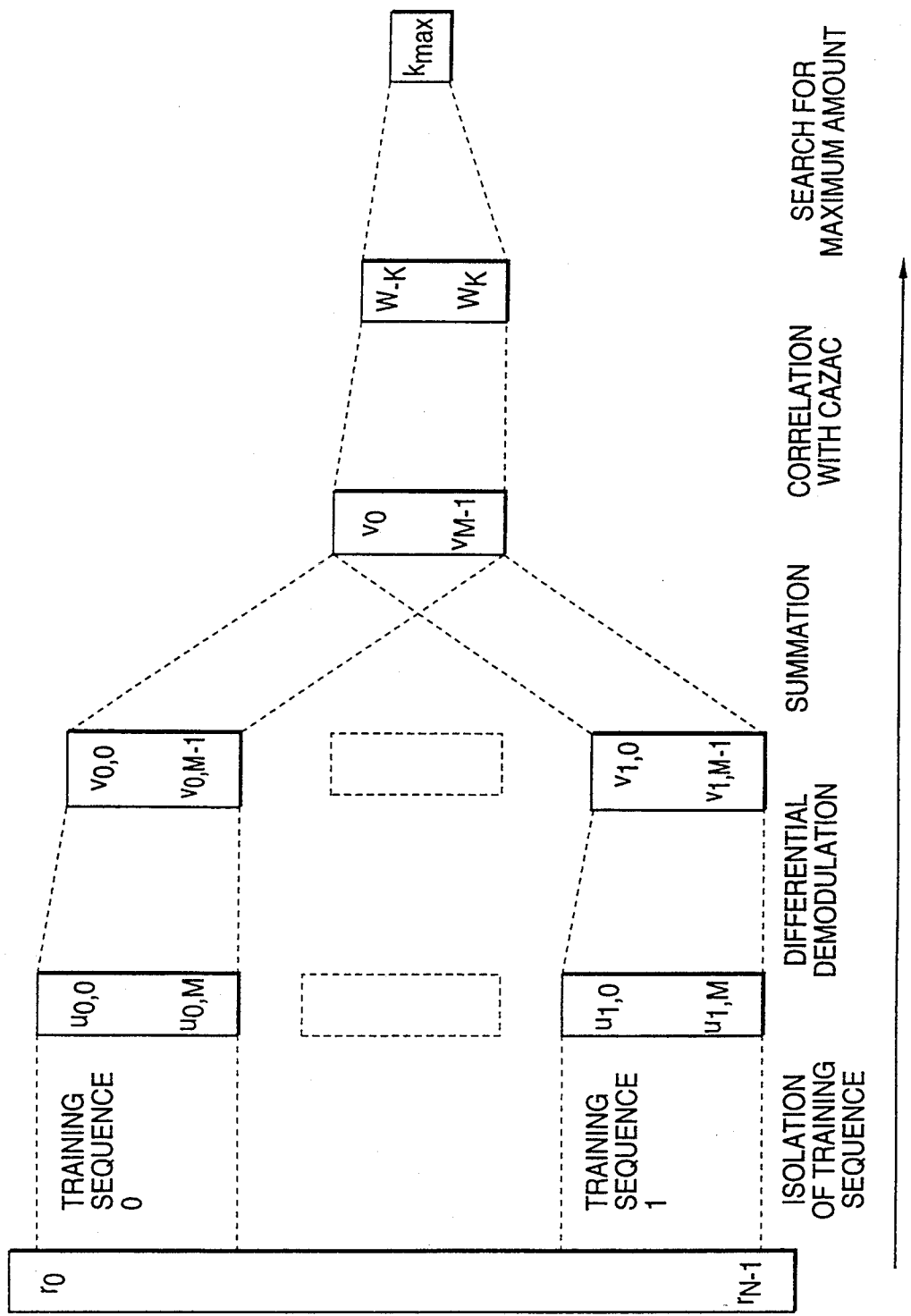
FIG. 3 shows a simplified processing sequence for a special case.
Figure 4:
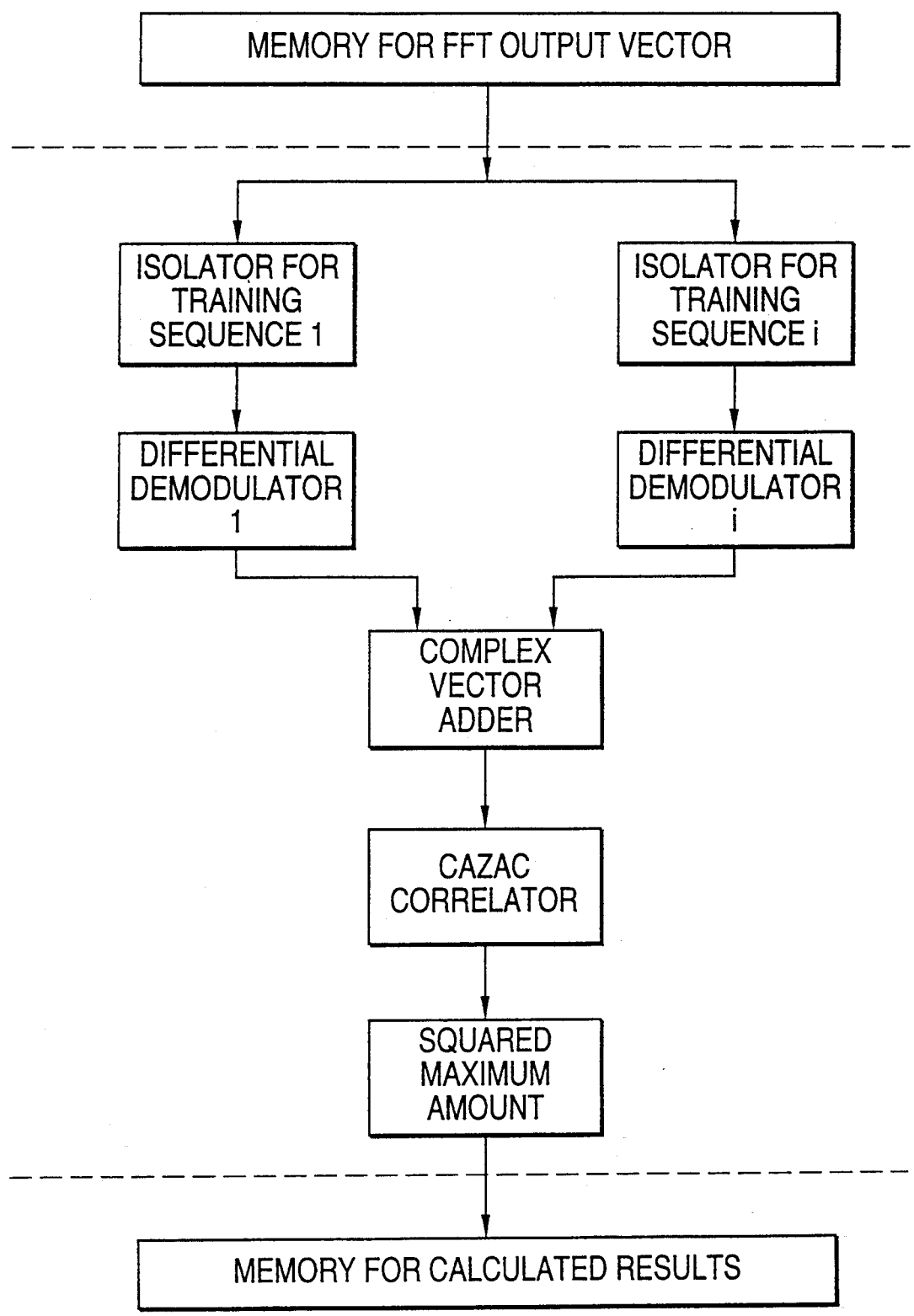
FIG. 4 shows an arrangement corresponding to the simplified processing sequence of FIG. 3.
Figure 13:
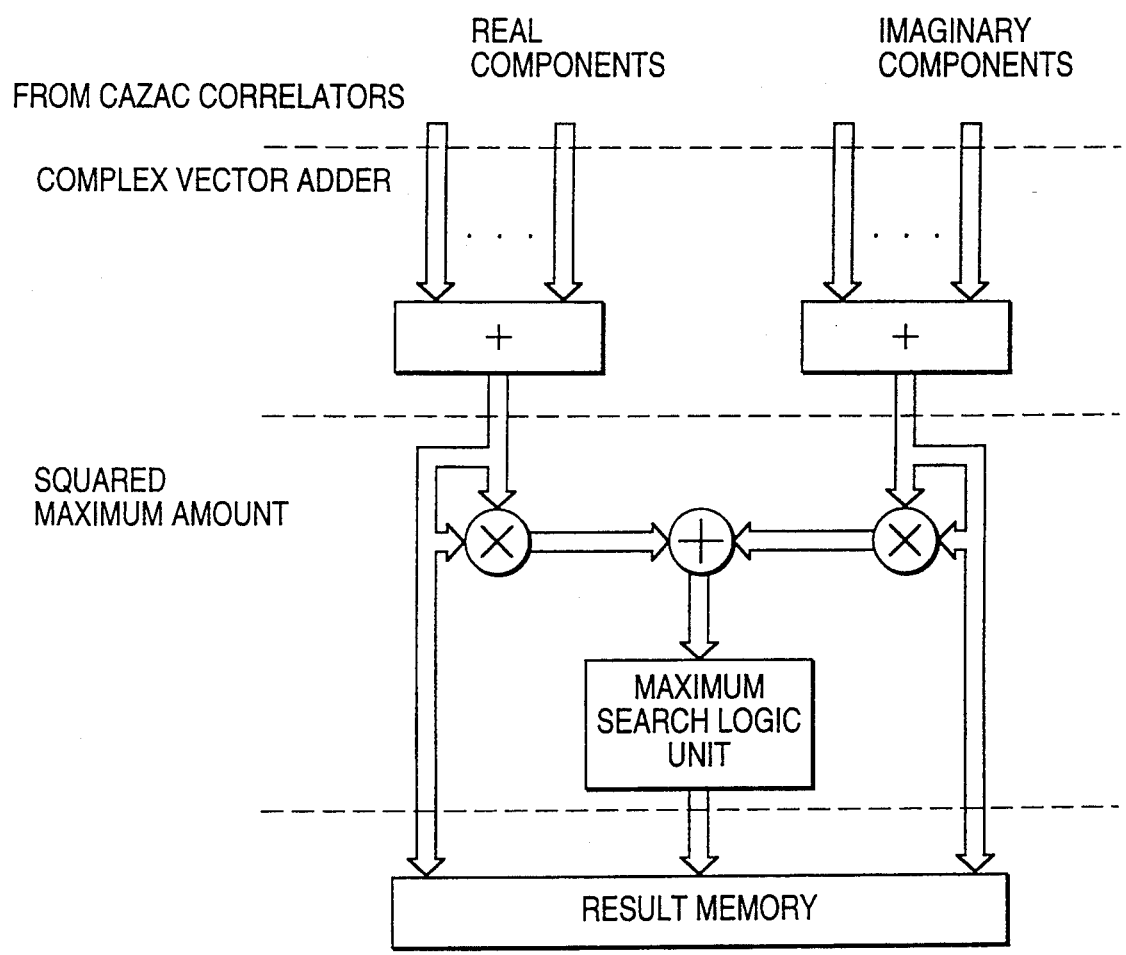
Figure 14B:
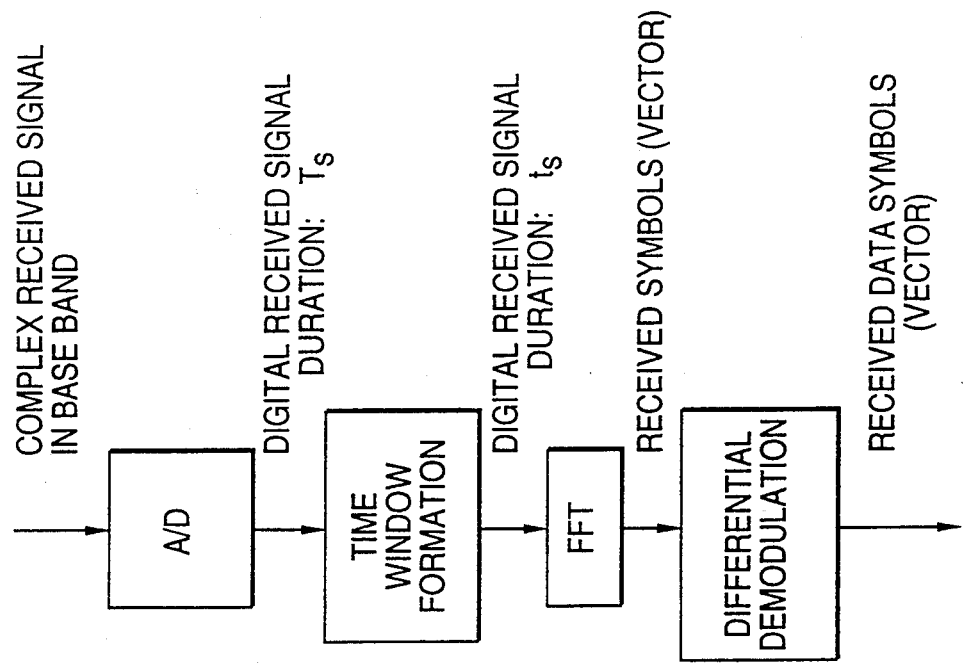
FIG. 14b shows a block circuit diagram of a COFDM demodulator realized digitally using the fast Fourier transformation (FFT)
Figure 14A:
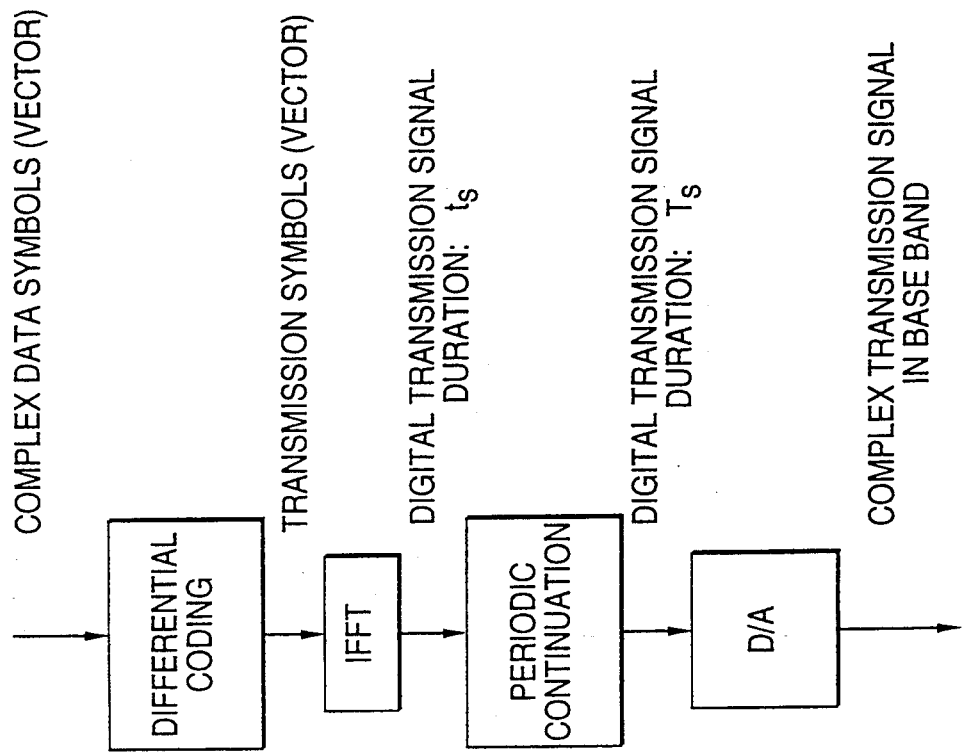
FIG. 14a shows a block circuit diagram of a COFDM transmitter which generates a transmission signal digitally using the inverse fast Fourier transformation (IFFT)
Figure 15:
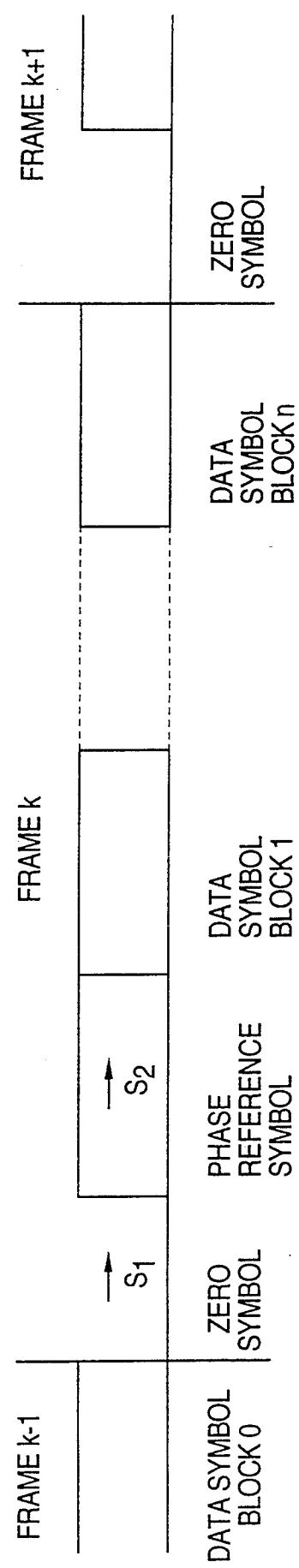
FIG. 15 shows a frame diagram for data transmission in the COFDM system.

The complex vector addition, as shown in FIG. 13, simply provides the summation of a plurality of output vectors of the correlators separated according to real components and imaginary components for different test sequences, resulting in a complex sum vector. From this vector, a squared-amount vector can be formed by squaring the real parts and imaginary parts of the individual vector elements; within this vector, the element having the maximum amount is determined. The results of the maximum search and the complex vector addition are stored in a result memory. The method according to the invention is considerably simplified if the TFPC is constructed of four CAZAC sequences which were produced from one CAZAC sequence. Then the vectors belonging to the different training sequences can be combined directly already after the differential demodulation. For this purpose $u = \Sigma_i a_i u_i$ is formed. The $a_i$ values then take on the values 1, j, −1 and −j. $a_i$ is a conjugate complex to the factor with which the original CAZAC sequence was multiplied to obtain the CAZAC sequence that is the basis of the $i^{th}$ training sequence. The combination of the signals now requires the calculation of the correlation with the CAZAC sequence only once. FIG. 3 shows the simplified processing sequence in this special case. FIG. 4 shows the corresponding arrangement. The configuration and processing are effected separately until the complex vectors $V_i$ are formed through correlation, as in different training sequences. The simplification arises from the fact that the complex vector addition is already applied to the output vectors of the differential demodulators, and only one sum vector formed during this is subjected to correlation. The explanations for FIGS. 1 and 2 apply to the function.

The method for precisely determining the frequency deviation between transmitter and receiver makes it possible to determine this deviation with an accuracy to a fraction of the subcarrier spacing. It assumes a rough knowledge of the frequency deviation, that is, it builds on the above-described method of roughly determining the frequency deviation. There the index $k_{max}$ of the correlation maximum was found. This index is assumed to be known for the processing to follow. It is also assumed that vector w is known. Then the precise determination of the frequency deviation is effected as follows:

1. Isolation of the training sequences. The position of the training sequences in the transmitted TFPC is assumed to be known. A training sequence begins in the transmitted TFPC at $s_{2,k0}$. Then the (M+2)-dimensional vector u' is calculated as follows:

$$u_k' = r_{k + k0 + k_{max} + \frac{L-M-1}{2}} \quad 0 \leq k \leq M + 1 \quad (8)$$

If the TFPC contains several training sequences, the procedure is the same for each one of them and several vectors $u_i'$ are obtained.

2. Modified differential demodulation. The M-dimensional vector v' is determined with the aid of the following equation:

$$v_k' = u_{k+1}' u_{k+1}'^* + u_{k+2}' u_k'^* \quad 0 \leq k < M \quad (9)$$

If the TFPC contains several training sequences, the procedure is the same for each one of them and several vectors $v_i'$ are obtained.

3. Reduced cyclical correlation with the CAZAC sequence. Vector v' is correlated with the CAZAC sequence on which the training sequence is based. The following values are calculated:

$$B = \sum_{m=0}^{M-1} v_m' c_m^* \quad (10)$$

and $$C = \sum_{m=0}^{M-1} v_m' c^*_{(m+1) \bmod M} \quad (11)$$

If there are several training sequences in the TFPC, this calculation is performed for each $v_i'$ and the associated $B_i$ and $C_i$ are obtained. These are then added together in each case: $C = \Sigma_i C_i$ and $B = \Sigma_i B_i$.

4. From the rough determination of the frequency deviation the value $w_{kmax}$ is available. The values $D = 2 W_{kmax} - C$ are calculated. The precise measurement of the frequency deviation is then effected as follows:

$$\Delta F = F_s \left( k_{max} + \frac{EC^* - DB^*}{EE^* + DD^*} \right) \quad (12)$$

Figure 5:
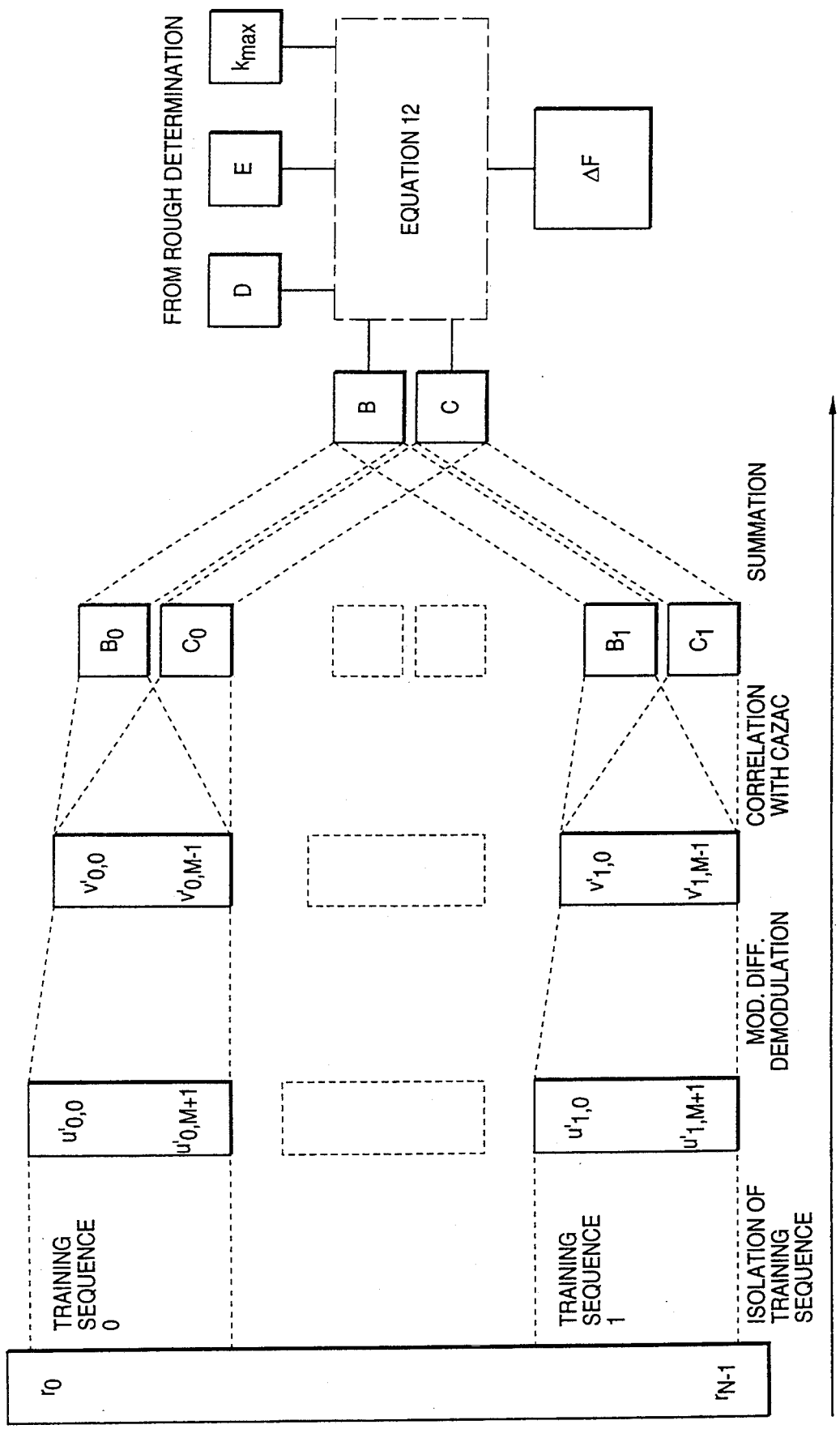
FIG. 5 shows a sequence for the precise measurement of the frequency deviation.
Figure 6:
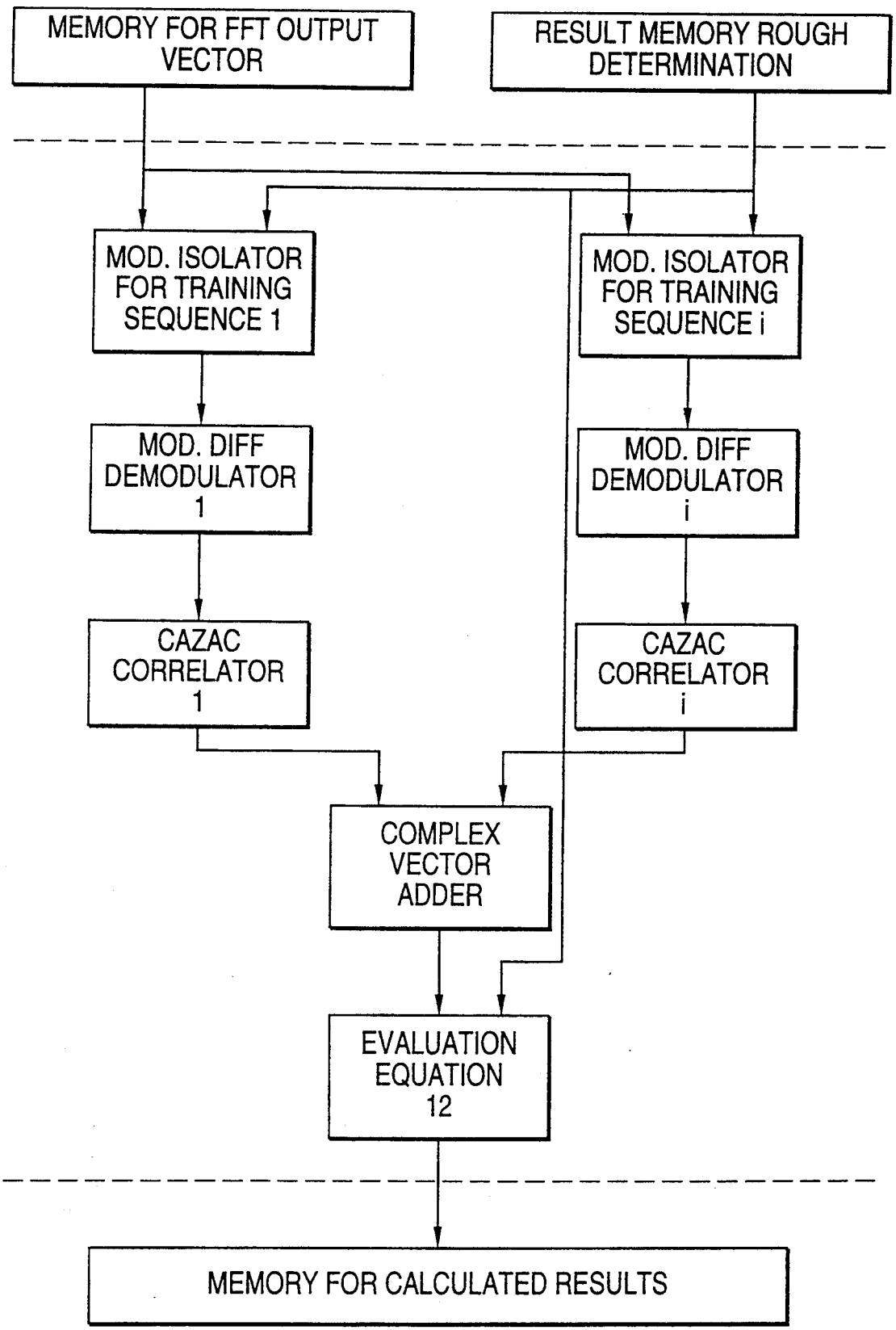
FIG. 6 shows an arrangement corresponding to the FIG. 5 sequence.
Figure 11:
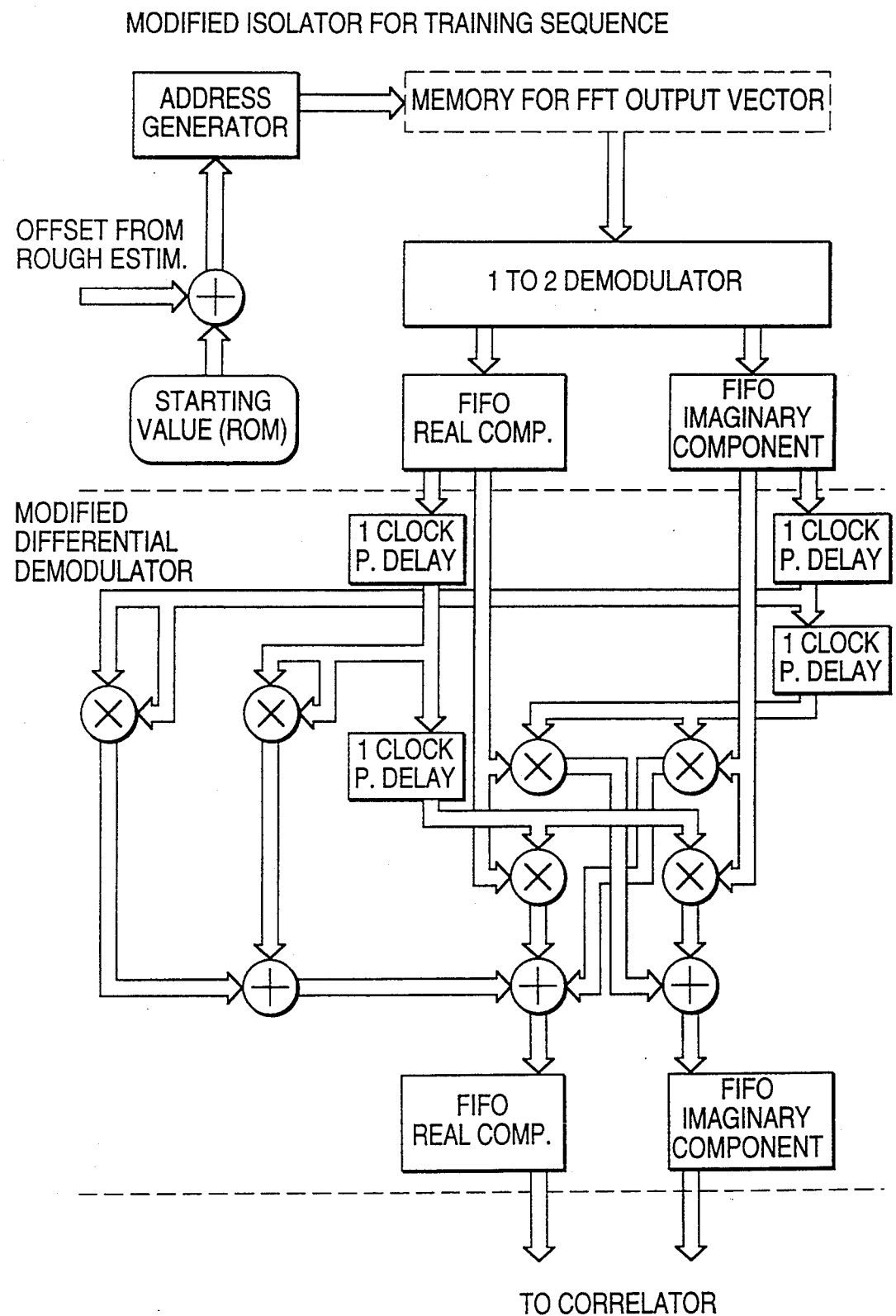
FIG. 11 shows the configuration of an exemplary modified isolator.

The above-described sequence for the precise measurement of the frequency deviation is shown in FIG. 5. FIG. 6 shows a corresponding arrangement. FIG. 11 shows the configuration of an exemplary, modified isolator.

The modified isolator and demodulator shown in FIG. 11 is configured similarly to the one shown in FIG. 10, but differs from it in the following essential points:

a) the shift $k_{max}$ ascertained from the rough determination of the frequency deviation is superposed onto the starting value for a training sequence stored in the read-only memory (ROM), so the segment of the receiver vector that is shifted by $k_{max}$ is read out of the FFT output memory as a training sequence;

b) in differential modulation, the values multiplied together in a complex manner corresponding to the second sum in Equation (9) are two register cycles apart;

c) for the complex value between the two values processed according to b), the squared amount is formed corresponding to the first sum in Equation (9) and added to the complex product according to b) in accordance with Equation (9); since the squared amount is always real, this addition only takes place in the signal path of the real part.

Figure 7:
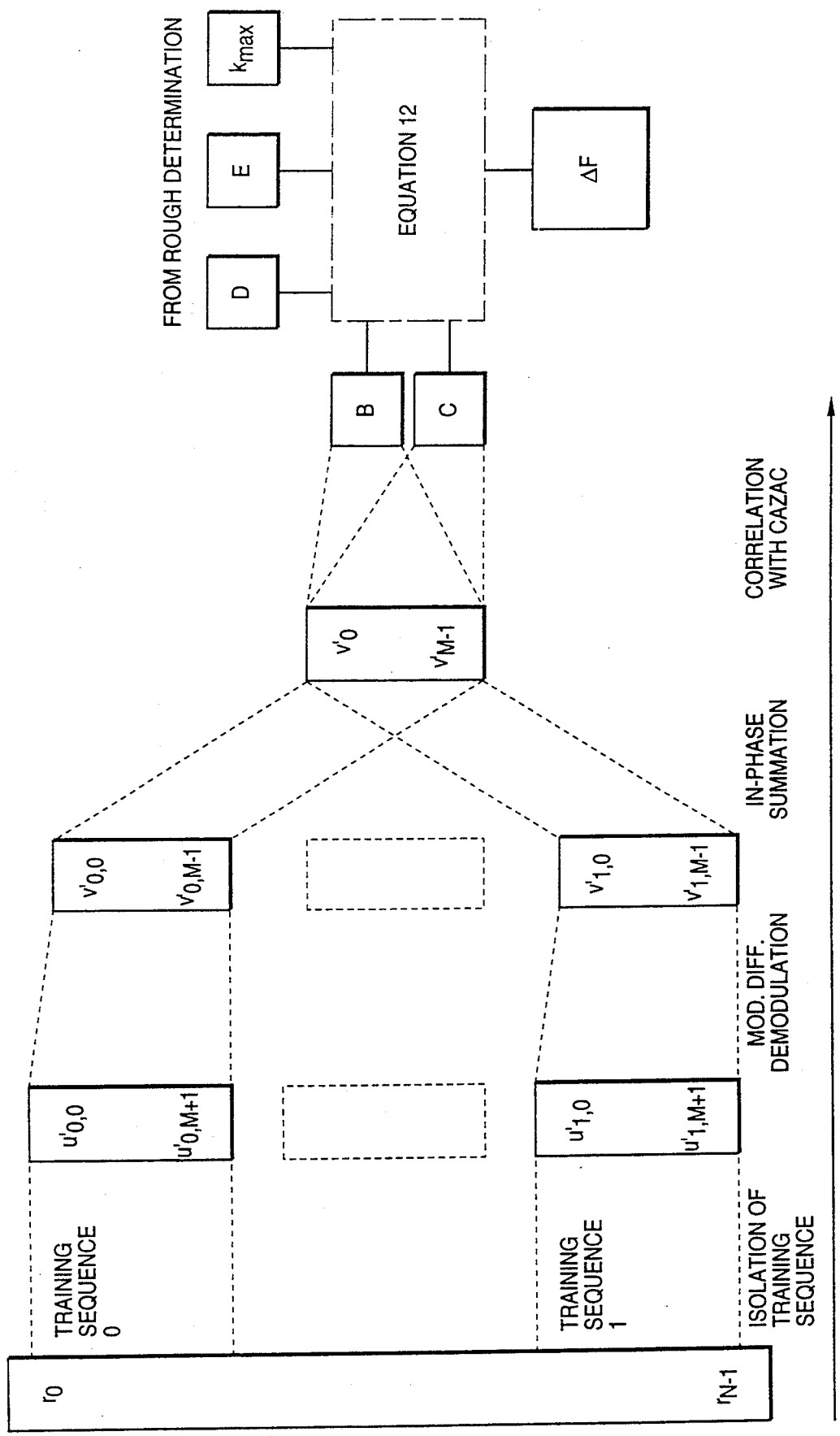
FIG. 7 shows a special case processing sequence.
Figure 8:
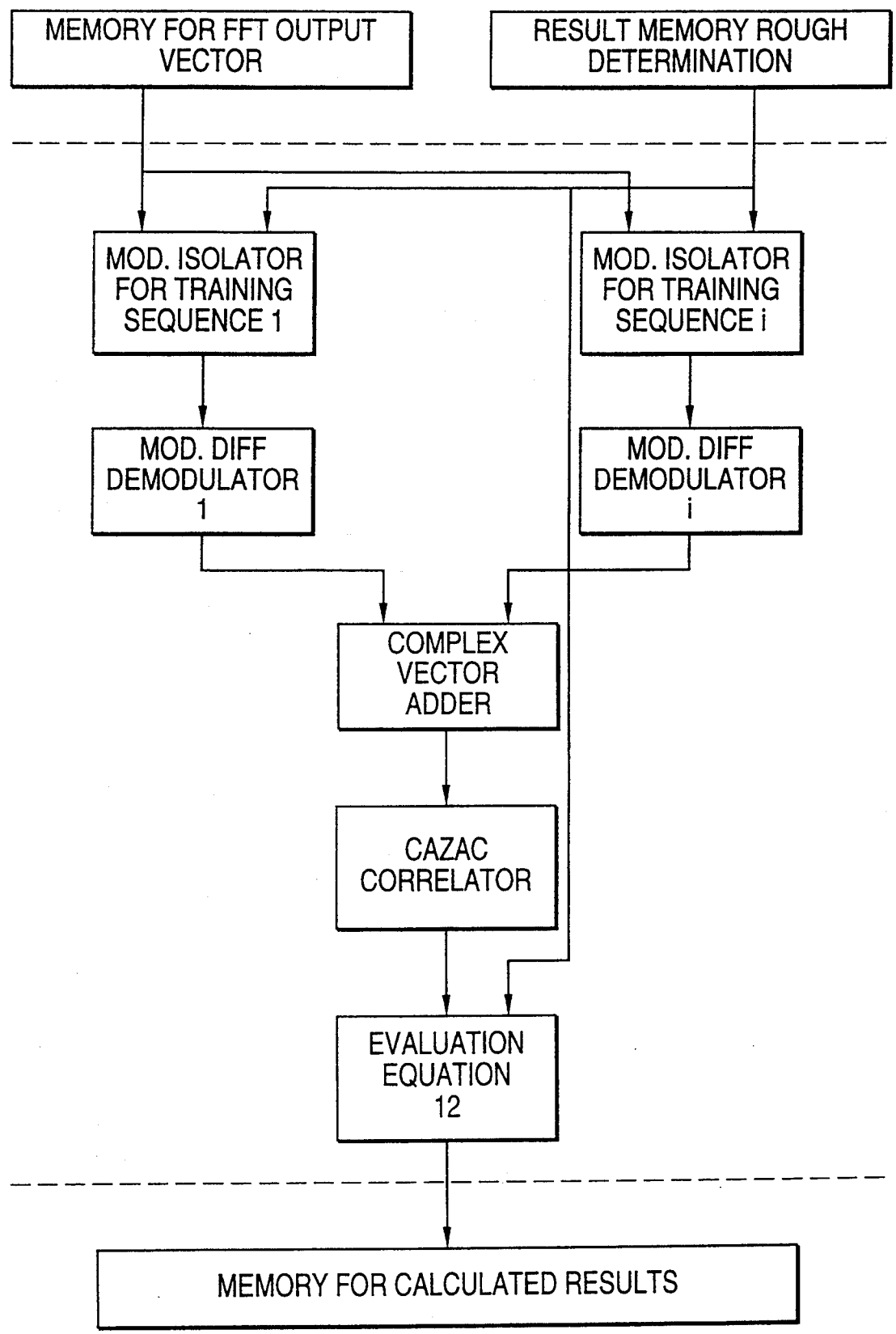
FIG. 8 shows an exemplary arrangement for the special case of FIG. 7.

With a TFPC constructed of four CAZAC sequences it is possible to combine the various training sequences before the cyclic correlation. The reduction in computation effort realized doing this, however, since only two values are calculated for the correlation function, is not so significant as in the rough determination of the frequency deviation where L−M values were calculated. FIG. 7 shows the sequence in this special case. FIG. 8 depicts an exemplary arrangement for the special case. The differences between the example shown in FIGS. 7 and 8 and the one shown in FIGS. 5 and 6 lie in the simplification, namely that the complex vector addition is already applied to the output vectors of the differential demodulators, and only one sum vector formed during this is subjected to correlation. Refer to the explanations of FIGS. 5 and 6 for the function.

Figure 9:
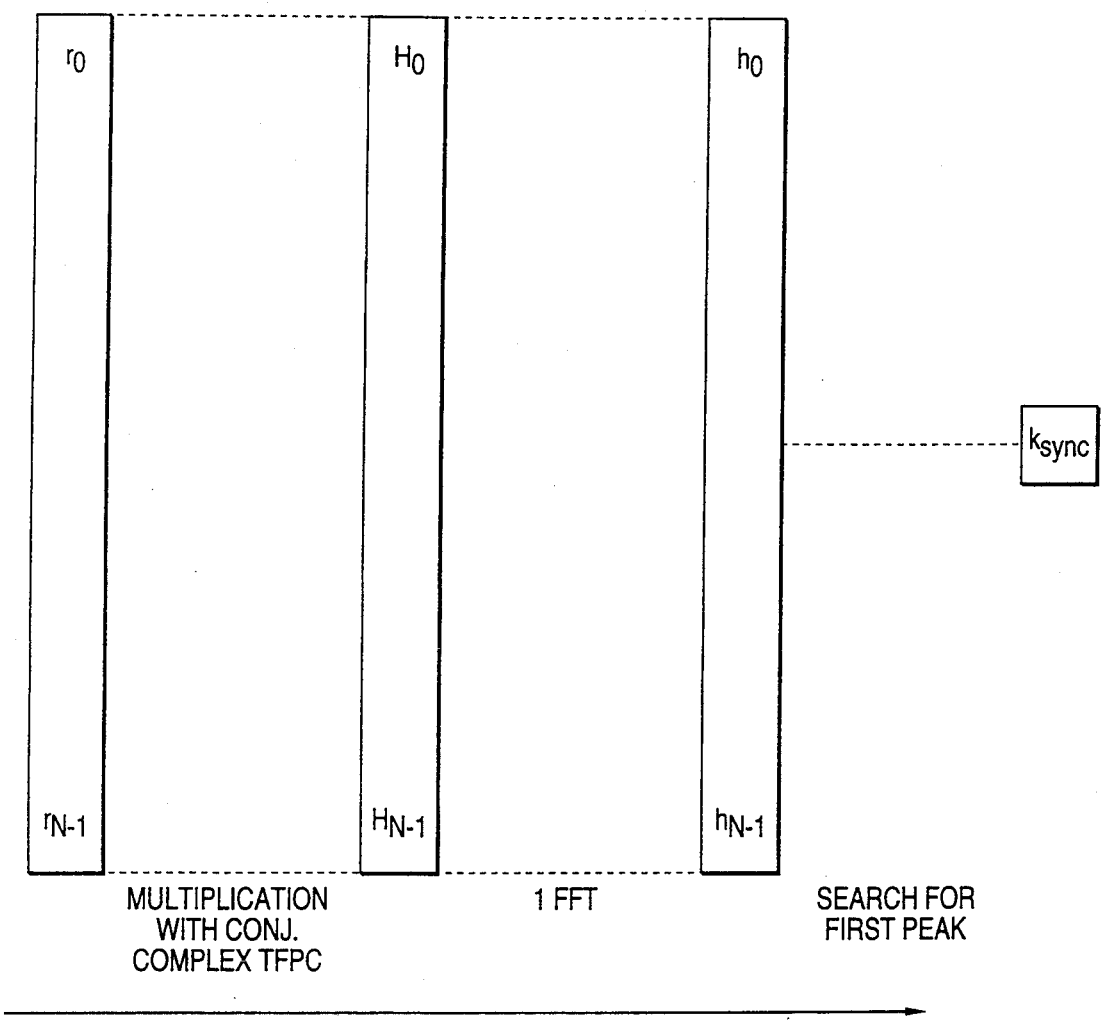
FIG. 9 shows a sequence for measuring a channel pulse response.

The sequence for measuring the channel pulse response is shown in FIG. 9.

To measure the channel pulse response, vector $r_2$ is multiplied element by element with the conjugate complex TFPC transmission signal $s_2$ which is stored in the receiver. This results in the N-dimensional vector H as follows:

$$H_k = r_{2,k} s^*_{2,k} \quad (13)$$

H is an estimate of the transmission function of the Channel. This vector is transformed with the inverse, fast Fourier transformation (IFFT) into the vector h which constitutes an estimate of the channel pulse response. Fine synchronization is effected by determining the first index $k_{sync}$ at which the channel pulse response has a significant energy component.

The TFPC is also suitable as a phase reference since it has an energy content other than zero in every active subchannel. The TFPC that has been normalized in each subchannel to an amplitude of 1 is fed, at the transmitter, to the differential coder and, at the receiver, to the differential demodulator. If the TFPC has constant energy components in all subchannels, this is an advantage since the phase noise in the noise channel is then the same in all subchannels.

I claim:

1. A communication method for a multi-channel transmission system, comprising:

transmitting digitally-coded signals modulated in sequential symbol blocks at a plurality of carrier frequencies with a transmitter; and receiving and demodulating said digitally-coded signals with a receiver;

wherein, in the transmitting, a test signal is generated in at least one symbol block in at least one of the plurality of carrier frequencies, the test signal containing at least one periodic, differentially coded, self-orthogonal sequence of a constant amplitude.

2. A method according to claim 1, wherein the test signal is associated with symbol block $s_2$; and wherein at least one contiguous section of transmission symbols $S_{2,k0+i}$ of a length L, where $i=0, 1, \ldots, L-1$, is produced where differentially, periodically continued, self-orthogonal training sequences $x_i$ of a constant amplitude are multiplied with a complex multiplier A, the training sequences $x_i$ being constructed of self-orthogonal sequences $c_i$ of a constant amplitude of a length $M<L$, wherein the following relationship applies:

$$x_i = \begin{bmatrix} 1 & \text{for } i = 0 \\ x_{i-1}C_{(i-1)modM} & \text{for } 1 \leq i \leq L-1 \end{bmatrix}$$

3. A method according to claim 1, further comprising repeating the test signal regularly.

4. A method according to claim 1, wherein the transmission signal is introduced into a frame structure in such a manner that each frame includes a test signal.

5. A method according to claim 2, wherein the test signal comprises a number of training sequences, the number being divisible by $n=4$, generated from a single self-orthogonal sequence $c_{o,i}$ of constant amplitude so that initially n self-orthogonal sequences $c_{l,i}$ of a constant amplitude are calculated, where $l=0, 1, \ldots, n-1$, which are employed to construct the training sequences, with the following relationship applying:

$$c_{l,i} = e^{j2\pi(l/n)} c_{o,i}$$

6. A method according to claim 5, wherein the receivinq with the receiver comprises using the test signal to at least one of:

(a) determine the existence of any carrier frequency deviation between transmitter and receiver, (b) determine any synchronization error between transmitter and receiver; and (c) measure a pulse response of a transmission channel between transmitter and receiver.

7. A method according to claim 6, wherein the transmitting with the transmitter further comprises performing differential modulation between adjacent symbol blocks, the test signal being a phase reference symbol.

8. A method according to claim 6, wherein the receiving with the receiver further comprises performing a fast Fourier transformation FFT on the received test signal.

9. A method according to claim 8, wherein the receiving with the receiver further comprises obtaining a rough measurement of a carrier frequency deviation between the transmitter and receiver for the received test signal after performing the FFT, by the following steps:

(a) isolating at least one received training sequence $r_{2,k0+i}$ of a length $M+1$, with $0.5(L-M-1) \leq i \leq 0.5(L+M-1)$, where M is the length of the associated, self-orthogonal training sequence of constant amplitude and L is the length of the associated transmitted training sequence, and producing at least one isolated training sequence as an $(M+1)$-dimensional vector u;

(b) performing differential demodulation of the at least one isolated training sequence u and producing at least one isolated, differentially demodulated training sequence as an M-dimensional vector v;

(c) cyclic correlation of the at least one isolated, differentially demodulated training sequence v of a length M with a self-orthogonal sequence $c_m$ of constant amplitude of length M, on which it is based, and producing at least one $(L-M)$-dimensional vector w;

(d) determining a frequency deviation by determining index $k_{hd\ max}$ of a maximum valued element in the at least one vector w.

10. A method according to claim 9, wherein the receiving with the receiver further comprises determining a precise measurement of carrier frequency deviation between transmitter and receiver using the values $k_{max}$ and w from the rough determination of the frequency deviation.

11. A method according to claim 6, wherein the receiving with the receiver further comprises processing a plurality of training sequence with the receiver, differentially weighting and summing at least one of a plurality of the vectors u, a plurality of the vectors v, and a plurality of the vectors w in each case.

12. A method according to claim 8, further comprising measuring channel pulse response using the test signal, the measuring comprising:

(a) multiplying the received test signal $r_{2,k}$ that is subjected to the FFT, element by element with a conjugate complex symbol lock $s_{2,k}*$ associated with the test signal transmitted by the transmitter to produce a result vector; and (b) calculating an inverse FFT for the result vector of step (a).

13. A method according to claim 12, comprising using the channel pulse response measurement for fine synchronization.

14. A receiver arrangement for a implementing the method according to claim 8, the receiver arrangement comprising:

FFT means for calculating the FFT of the received test signal, memory means for storing output values from the FFT means as at least one training sequence, at least one respective isolation means for isolating a training sequence read from said memory means, at least one respective differential demodulation means for performing differential demodulation of a respective isolated training sequence from said at least one isolation means, at least one respective correlation means for performing correlation of a respective isolated demodulated training sequence from said at least one respective demodulation means, and complex vector adder means for summing correlation results of said at least one respective correlation means.

15. In multichannel coded orthogonal frequency division multiplexing transmission system using a plurality of transmission frequencies, a method of measuring a frequency deviation between a transmitter and a receiver and correcting a receiver oscillator, comprising:

transmitting a series of frames from the transmitter to the receiver as modulated sequential symbol blocks at a plurality of carrier frequencies;

transmitting a test signal periodically in at least one of said series of frames within at least one symbol block using differential coding, by modulating at least one of the carrier frequencies, the test signal being a self-orthogonal sequence of a constant amplitude.

16. In a multichannel coded orthogonal frequency division multiplexing transmission system using a plurality of transmission carrier frequencies, wherein a series of frames are transmitted from a transmitter to a receiver as modulated sequential symbol blocks at a plurality of the carrier frequencies, and wherein a test signal is periodically transmitted in at least one of said series of frames within at least one symbol block using differential coding, by modulating at least one of the carrier frequencies, the test signal being a self-orthogonal sequence of a constant amplitude, wherein the receiver performs a fast fourier transform on a received signal, a receiver arrangement comprising:

memory means for storing a fast fourier transform output vector of the received signal including the test signal;

isolator means for isolating training sequences from the output vector stored in the memory means;

differential demodulator means for performing a differential demodulation of isolated training sequences from said isolator means;

correlator means for performing a correlation of demodulated training sequences from said differential demodulator means; and calculating means for calculating a result by arithmetically operating on correlated training sequences from said correlator means.

17. The receiver arrangement according to claim 16, wherein said calculating means comprises a complex vector adder.

18. The receiver arrangement according to claim 17, wherein said calculating means further comprises a maximum-squaring means for producing a squared maximum amount of an output from said complex vector adder.

19. The receiver arrangement according to claim 16, wherein said correlator means comprise constant amplitude zero autocorrelation correlators producing real and imaginary components;

wherein said calculating means comprises a complex vector adder having respective adding means for the real and imaginary components from said correlator means; and wherein said calculating means further comprises squaring means for squaring respective real and imaginary added values from said respective adding means, an adder for adding together squared values from the squaring means, and maximum search logic for finding a maximum value from added values from the adder.

20. The receiver arrangement according to claim 16, wherein said memory means includes memory for storing a rough determination of frequency deviation between the transmitter and the receiver;

wherein the rough determination includes:

at least one $(L-M)$-dimensional vector w produced by cyclic correlation of at least one isolated, differentially demodulated training sequence v of a length M with a self-orthogonal sequence $c_m$ of constant amplitude of length M, on which it is based, and an index $k_{max}$ of a maximum valued element in the at least one vector w; and wherein the rough determination is provided to the isolator means and the calculating means from the memory for storing a rough determination of frequency deviation between the transmitter and the receiver, and used to produce a fine determination of frequency deviation between the transmitter and the receiver.

21. In a multichannel coded orthogonal frequency division multiplexing transmission system using a plurality of transmission carrier frequencies, wherein a series of frames are transmitted from a transmitter to a receiver as modulated sequential symbol blocks at a plurality of the carrier frequencies, and wherein a test signal is periodically transmitted in at least one of said series of frames within at least one symbol block using differential coding, by modulating at least one of the carrier frequencies, the test signal being a self-orthogonal sequence of a constant amplitude, wherein the receiver performs a fast fourier transform on a received signal, a receiver arrangement comprising:

memory means for storing a fast fourier transform output vector of the received signal including the test signal;

isolator means for isolating training sequences from the output vector stored in the memory means;

differential demodulator means for performing a differential demodulation of isolated training sequences from said isolator means;

complex adding means for producing a complex summation of demodulated training sequences from said differential demodulator means;

correlator means for performing a correlation on the complex summation from said complex adding means; and squared maximum means for producing a squared maximum amount from correlation results from said correlator means.

22. The receiver arrangement according to claim 1, wherein said memory means includes memory for storing a rough determination of frequency deviation between the transmitter and the receiver;

wherein the rough determination includes:

at least one $(L-M)$-dimensional vector w produced by cyclic correlation of at least one isolated, differentially demodulated training sequence v of a length M with a self-orthogonal sequence $c_m$ of constant amplitude of length M, on which it is based, and an index $k_x$ of a maximum valued element in the at least one vector w; and wherein the rough determination is provided to the isolator means and the squared maximum means from the memory for storing a rough determination of frequency deviation between the transmitter and the receiver, and used to produce a fine determination of frequency deviation between the transmitter and the receiver.

* * * * *